(No Model.)
A. JENKINS.
TRUSS BRACE FOR VEHICLE AXLES.
No. 297,807. Patented Apr. 29, 1884.
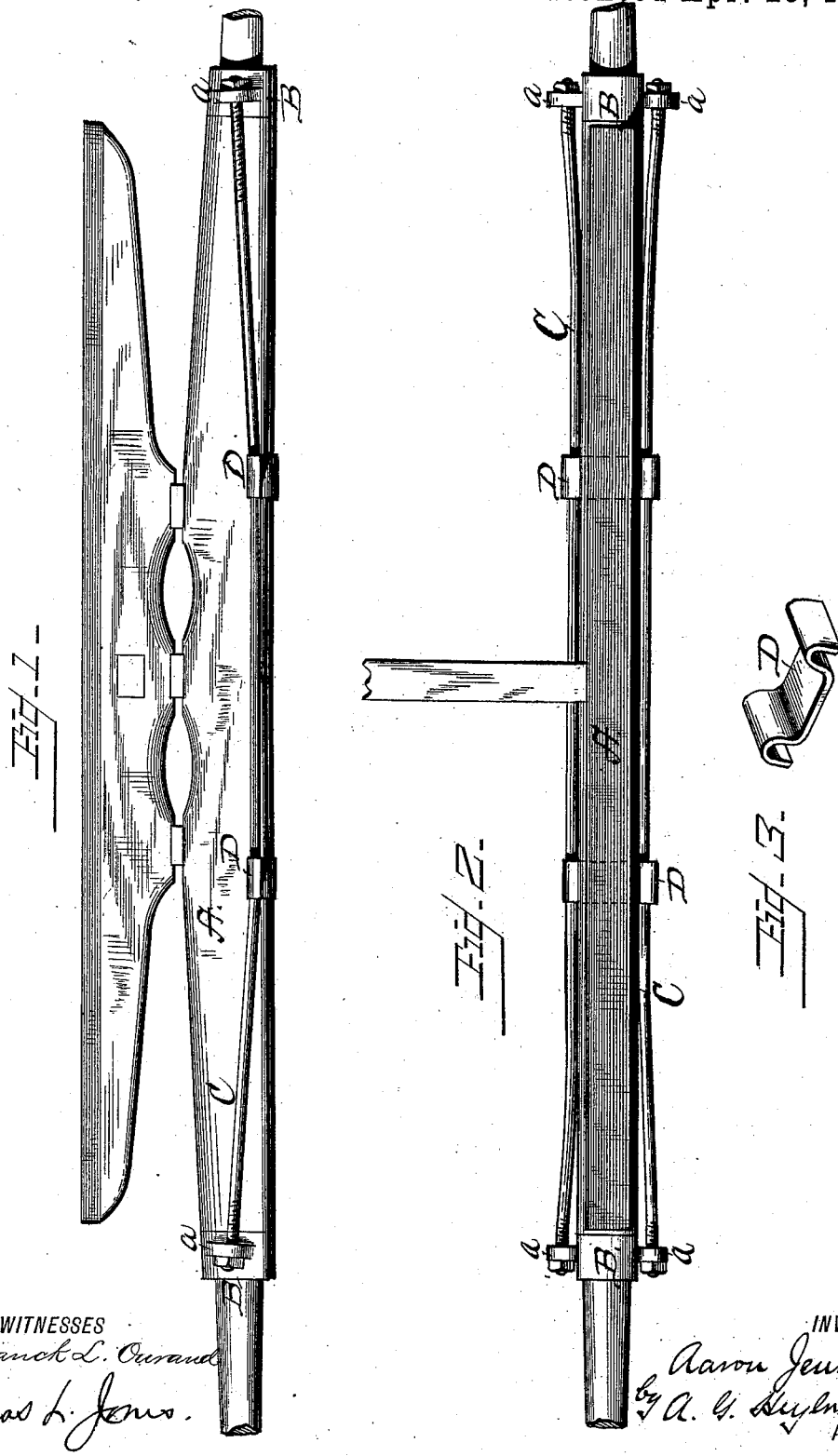

UNITED STATES PATENT OFFICE.

AARON JENKINS, OF WABASH, INDIANA.

TRUSS-BRACE FOR VEHICLE-AXLES.

SPECIFICATION forming part of Letters Patent No. 297,807, dated April 29, 1884.

Application filed December 17, 1883. (No model.)

*To all whom it may concern:*

Be it known that I, AARON JENKINS, a citizen of the United States of America, residing at Wabash, in the county of Wabash, in the State of Indiana, have invented a new and useful Truss for Vehicle-Axles, of which the following is a specification.

My invention relates to improvements in truss-braces for strengthening vehicle-axles; and it consists in the novel construction and combination of parts, as will be hereinafter more fully described, and specifically pointed out in the claims.

I am aware that heretofore a truss-brace for the purpose named has been made wherein the truss-rods are passed through the eyes of clips secured by bolts to the under side of the axle, the rods being arranged longitudinally under the axle, closely adjoining the sides of the same; but such arrangement is objectionable, since the rods are liable to be struck by any obstacle reaching them in the progress of the vehicle, and they also catch and hold brush or sticks, which become jammed in between the axle and truss-rods. To remove these objectionable features of present devices of the kind, I extend the ears of the clips to reach a short distance up the sides of the axle, and arrange the truss-rods close along the sides of the axle, but somewhat below the horizontal center thereof.

I attain the purposes of my improvements by means of the appliances illustrated in the accompanying drawings, wherein—

Figure 1 is a side view of an axle with my improvements attached. Fig. 2 is a top view thereof, and Fig. 3 is a view of one of the clips.

A represents the axle, provided with skeins B, of any of the usual constructions, but formed with eyes *a* on each side thereof, for the passage of the ends of the truss-rods, substantially as seen.

C represents the truss-rods, having screw-threaded ends, and provided with screw-nuts, wherewith to adjust them when the ends are passed through the eyes in the skeins.

D represents clips made substantially of the form as seen in Fig. 3 of the drawings—in any case formed to set to the conformation of the bottom of the axle, and having the ends extended a short distance up the sides of the axle, and terminating in hooks adapted to hook over and retain the truss-rods when arranged in position. These clips are held in place by the tension of the truss-rods, no bolts being used, as being unnecessary, and because they weaken the axle.

The operation or effect of the completed improvements is apparent from the foregoing description of the component parts; but it will be observed that by arranging the truss-rods above the lower edge of the axle I obtain a more direct pull on the skeins, and thus obviate the tendency to loosen or fracture them by a twisting strain. I also avoid weakening the axle by forming seats in or projecting bolts through it to secure the clips in or by.

By forming the clips according to the form of the bottoms of the axle, and extending them up the sides thereof, I obtain the greatest strength possible to give them. As the truss-rods are above the lower line of the axle, they cannot be damaged in passing over obstacles, as other trusses are liable to be.

What I claim as my invention, and desire to secure by Letters Patent, is—

1. A clip for axle truss-braces, formed to fit under the face of the axle, and having its ends extended upward against the sides thereof, and terminating in hooks to fit over the truss-rods, substantially as shown, and for the purpose described.

2. The combination, with the axle provided with skeins formed with side eyes, and the truss-braces arranged against the sides of the axle, above the lower line thereof, and adjustably secured to the skeins, of the truss-clips formed to fit the under face of the axle, and their ends extended up to form ears terminating in hooks adapted to engage with and thereby be held in position by the tension of the truss-braces, substantially as described.

In testimony whereof I have hereunto set my hand in the presence of two attesting witnesses.

AARON JENKINS.

Attest:
WILLIAM H. BENT,
H. B. SHIVELY.